MAGNETIC TRANSDUCING METHOD AND SYSTEM

Filed Sept. 4, 1957 4 Sheets-Sheet 1

Donald L. Drukey
INVENTOR.

BY Albert Rosen
Morris Spector
ATTORNEYS

Jan. 17, 1961 D. L. DRUKEY 2,968,798

MAGNETIC TRANSDUCING METHOD AND SYSTEM

Filed Sept. 4, 1957 4 Sheets-Sheet 2

Donald L. Drukey
INVENTOR.

BY Albert Rosen
Morris Spector
ATTORNEYS

MAGNETIC TRANSDUCING METHOD AND SYSTEM

Filed Sept. 4, 1957 4 Sheets-Sheet 3

Donald L. Drukey
INVENTOR.
BY Albert Rosen
Morris Spector
ATTORNEYS

Donald L. Drukey
INVENTOR.
BY Albert Rosen
Morris Spector
ATTORNEYS

United States Patent Office 2,968,798

Patented Jan. 17, 1961

2,968,798

MAGNETIC TRANSDUCING METHOD AND SYSTEM

Donald L. Drukey, Manhattan Beach, Calif., assignor, by mesne assignments, to Thompson Ramo Wooldridge Inc., Cleveland, Ohio, a corporation of Ohio Filed Sept. 4, 1957, Ser. No. 681,975

3 Claims. (Cl. 340—174.1)

This invention relates to magnetic recording and playback methods and systems. In particular, the invention concerns systems employing transducing heads, such as magnetic recording or playback heads, in which a head moves with respect to magnetic tape at a speed which is different from the speed of passage of the tape across its support. Such systems prove especially advantageous in data analysis when it is desired to compare portions of the same or different signals with each other.

It is often desirable to repeatedly scan a section of magnetic tape in order to make the signals recorded thereon continually available for sampling. For example, this is often desirable in auto-correlation and cross-correlation in data analysis, and in studying low repetition rate phenomena (e.g., a radar picture) or transient phenomena (e.g., seismographic phenomena). The previous methods of accomplishing this have required a cutting out of the section of the tape to be analyzed and making the section into an endless loop so that it may be repeatedly scanned. This makes it difficult to continually analyze successive sections of tape.

Accordingly, one object of the invention is to provide improved means for auto-correlating a portion of a single magnetically recorded signal, or for cross-correlating portions of different magnetically recorded signals.

A further object is to provide an improved method of repeatedly scanning a transient or low repetition rate signal recorded on a portion of a long length of magnetic tape without resort to cutting out that portion of tape and forming it into an endless loop.

The foregoing and related objects are realized in accordance with the invention by the provision of an improved magnetic transducing method and system that makes use of a number of magnetic transducing heads that rotate at a high velocity relative to a stationary or slowly moving magnetic tape.

In one embodiment the mechanism comprises two transducing heads mounted for continuous, high velocity rotation in a circular path about magnetic tape. The tape is supported in an arcuate path around the periphery of a support disk and adjacent to the path of travel of the heads for scansion by them. The tape is continuously fed to the periphery of the support disk from a position outside of the plane of rotation of the heads so that the tape may be continuously fed to scanning position around the disk without interfering with the rotation of the heads. If the tape is slowly advanced in the arcuate path during the scansions, successive portions of the tape are scanned at high velocity while the tape itself is moved at low velocity. If the tape is maintained stationary during the rotation of the heads, one tape portion is subjected to repeated scansions.

In one embodiment, two playback heads are used, the heads being positioned to scan adjacent signal recording channels on the tape. The heads are also movable with respect to each other so that they may be relatively displaced along their path of travel. With this arrangement data from two channels may be cross-correlated and the resultant displayed on a cathode ray oscilloscope screen; a continuous, bright, graphical display is provided due to the repetitive availability of the data.

In the drawing, wherein like reference characters refer to like parts:

Figures 1, 4:
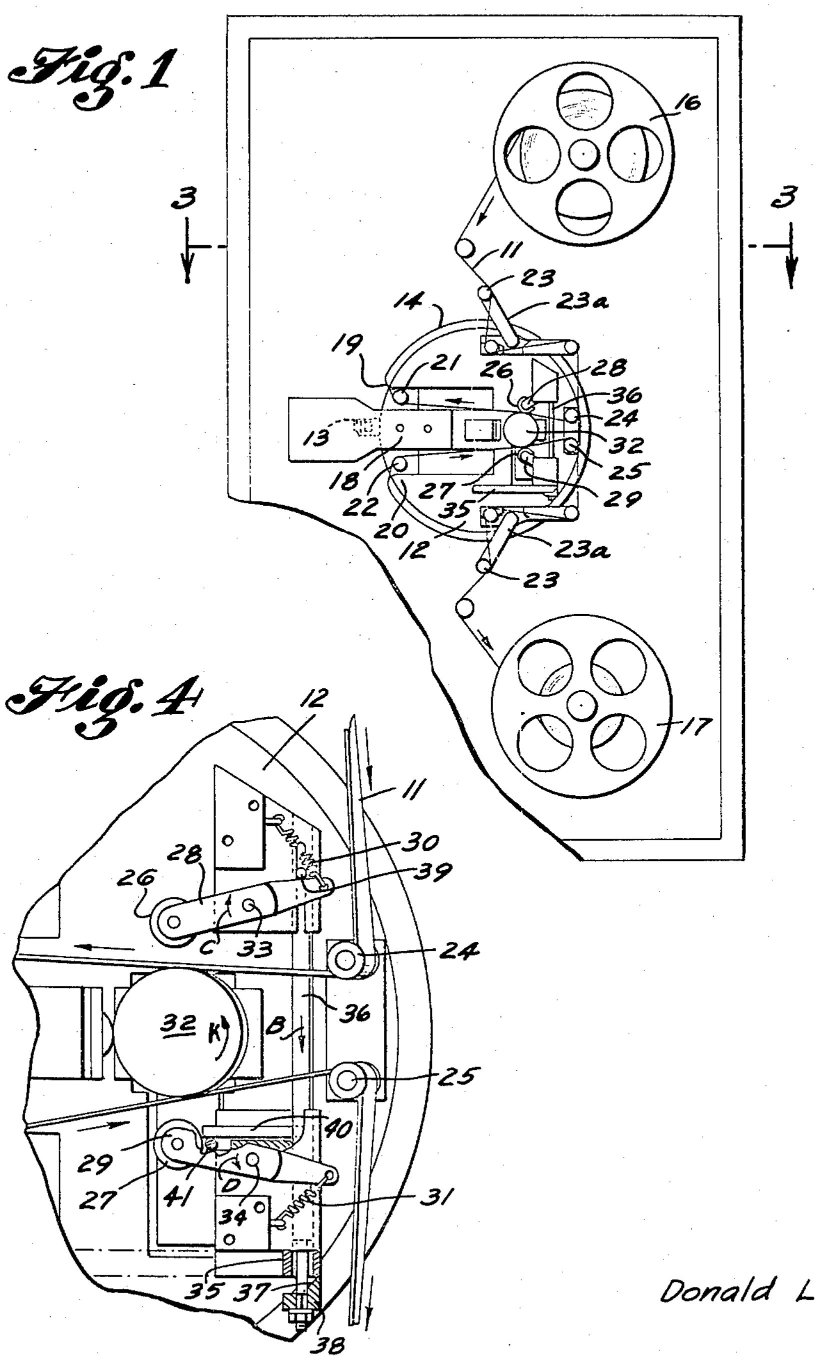
Figure 1 is a plan view of apparatus embodying the invention.
Figure 4 is an enlarged fragmentary view of a tape clamping mechanism of the apparatus of Figure 1 in an "open" position.
Figure 2:
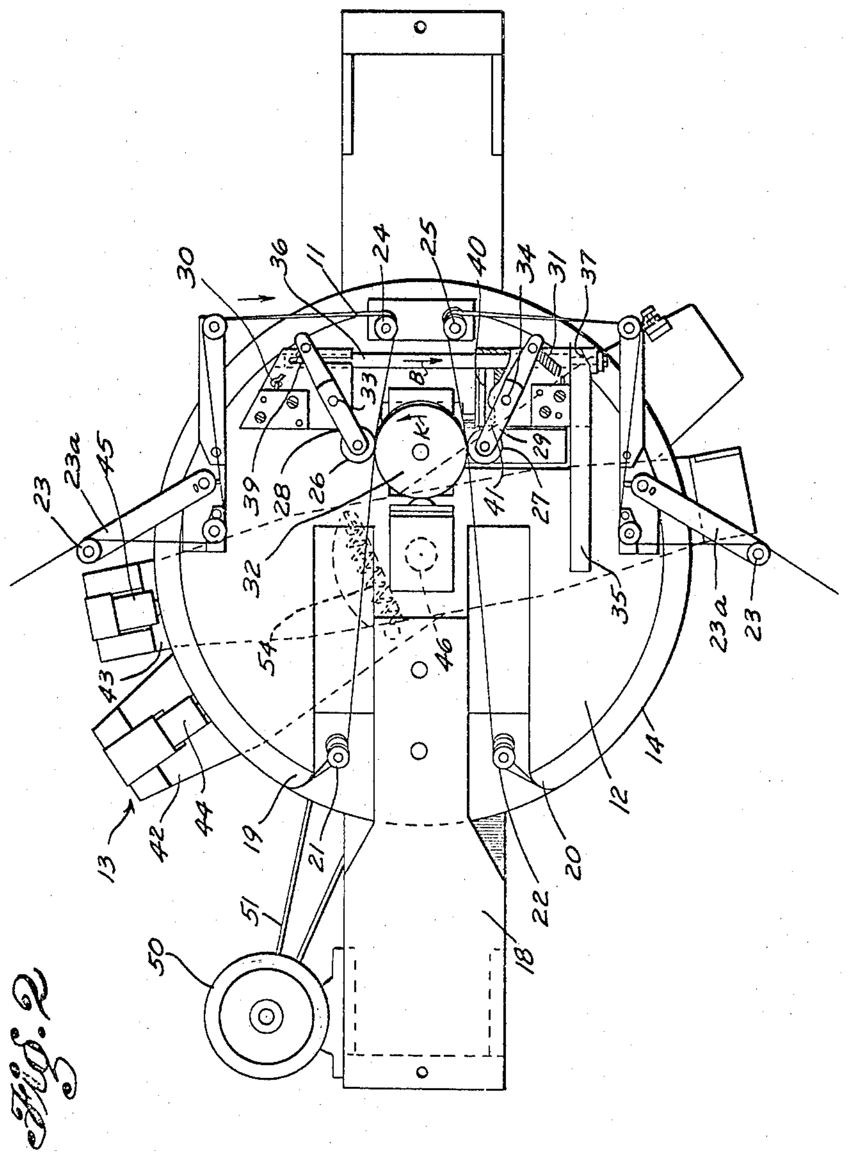
Figure 2 is an enlarged plan view of a part of the apparatus of Figure 1.
Figures 5, 6:
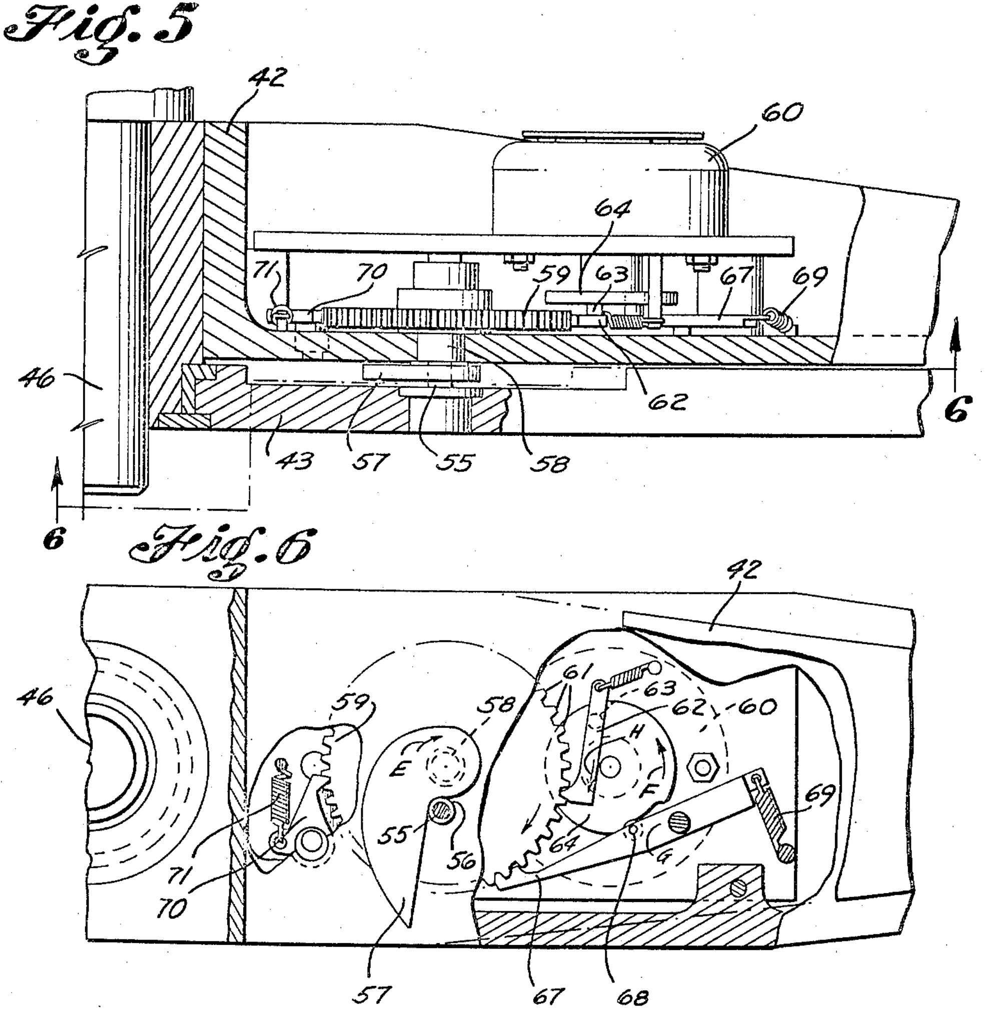
Figure 7:
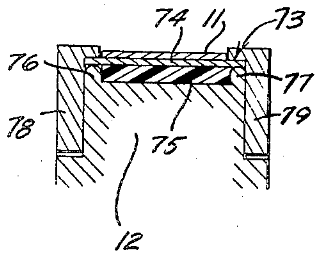
Figure 8:
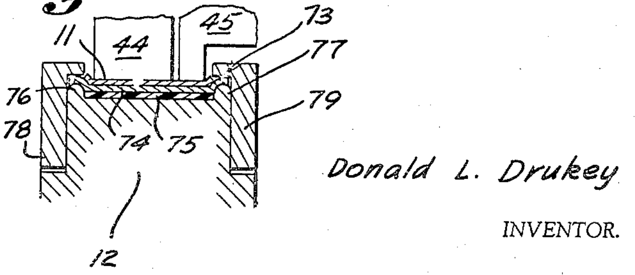

Figures 5 and 6 are, respectively, fragmentary side and top elevation views of a mechanism for varying the spacing between adjacent transducing heads in the apparatus of Figure 1, Figure 6 being taken through line 6—6 of Figure 5; and Figures 7 and 8 are fragmentary sectional views illustrating an aspect of a tape support member in the apparatus of Figure 2.

The general arrangement of the apparatus according to the invention is illustrated in Figure 1. The apparatus uses magnetic tape 11 supported around a portion of a drum or support disk 12. Magnetic transducing means 13 is mounted for rotation about the cylindrical outside support surface 14 of the disk 12 so that as the arm rotates the transducing means scans the tape. The tape 11 is threaded from a tape supply reel 16, around and along the outside or tape support surface 14 of the disk 12, and then to a take-up reel 17. As will be explained, the movement of the tape 11 along the surface 14 is effected in such a manner as to avoid interference with the rotation of the transducing means 13 around the surface.

The apparatus of the invention is described in greater detail in connection with Figure 2. The support disk 12, fixed to a frame 18, has a cylindrical tape support surface 14 that extends through about 300 degrees of a circle. The support disk 12 is provided with entrance and exit portions 19 and 20, respectively, through which the magnetic tape 11 is fed onto and off of the support surface 14. A first set of tape guiding pulleys 21 and 22 ,positioned adjacent to the entrance and exit portions 19 and 20, are each canted to one side so that magnetic tape 11 may be fed by the pulleys onto and off of the disk surface 14 from a position to one side of the plane of the disk. The angle of cant is illustrated at letter A in Figure 3. A second set of tape guiding pulleys 24 and 25 are positioned on the side of the disk 12 remote from the first set of pulleys 21 and 22 to better enable the passage of the tape to the disk surface from the aforementioned position on one side of the plane of the disk. The second set of pulleys 24 and 25 are each canted in the same direction as that of the first pulleys 21 and 22 to guide the tape back into a plane parallel to, but spaced from, the plane of the disk 12. The second set of pulleys 24 and 25 guide the tape 11 to and from, respectively, the tape pick-up and feed reels located on the one side of the plane of the disk.

Motors (not shown) connected to the supply and take-up reels 16 and 17, respectively, provide continuous tension on the tape through the apparatus. Tension pulleys 23 mounted on spring biased arms 23*a* maintained tension on the tape during the starting and stopping of the apparatus.

Figures 2 and 4 illustrate the means provided for driving the tape 11 around the surface 14 of the disk 12. Figure 2 shows the means in driving position while Figure 4 shows the means in a position being used during threading of the tape through the apparatus. The tape driving means takes the form of a pair of clamping rollers 26 and 27 mounted on supports 28 and 29, respectively, and spring biased by springs 30 and 31 for pressure contact against the capstan 32. The supports 28 and 29 are mounted on pivots 33 and 34, respectively, fixed to the disk 12. The capstan 32 is connected to a motor (not shown) for rotation in direction K for moving the tape through the apparatus. If the capstan driving motor referred to is of a reversible type, the tape may be driven in either of two directions through the apparatus.

Means are also provided for moving the clamping rollers 26 and 27 away from the capstan 32, from the "closed" position illustrated in Figure 2 to the "open" one illustrated in Figure 4, during a threading of the magnetic tape 11 around the disk support surface 14, and for moving the rollers back into spring biased contact against the capstan during operation of the apparatus. A control arm 35 is fixed to a control shaft 36 terminating at one end in a cam follower surface 37 at an oblique angle to the axis of the shaft. The cam follower 38 (Figure 4) of the control shaft 36 is arranged to lie in the position illustrated in Figure 2 during operation of the apparatus, when tension is required between the clamping rollers 26 and 27 and the capstan 32, and moves in direction B to the position illustrated in Figure 4 when the control arm 35 is raised in a direction away from the plane of the support disk 12 (in a direction up, out of the plane of the drawing). When the control shaft 36 moves in direction B it moves a pin 39 fixed to the shaft in the same direction and against the support 28 of one clamping roller 26. This urges the roller 26 in a direction C (Figure 4) away from the capstan 32. The movement of the shaft 36 in direction B also effects a movement of an arm 40, fixed to the shaft, in direction B. The movement of the arm 40 in direction B moves a pin 41 fixed to the other support 29 thus moving the other clamping roller 27 in a direction D (Figure 4) away from the capstan 32. The springs 30 and 31 aforementioned return the clamping rollers 26 and 27 to their positions against the capstan 32 when the control arm 35 is returned to the position shown in Figure 2.

Figure 3:
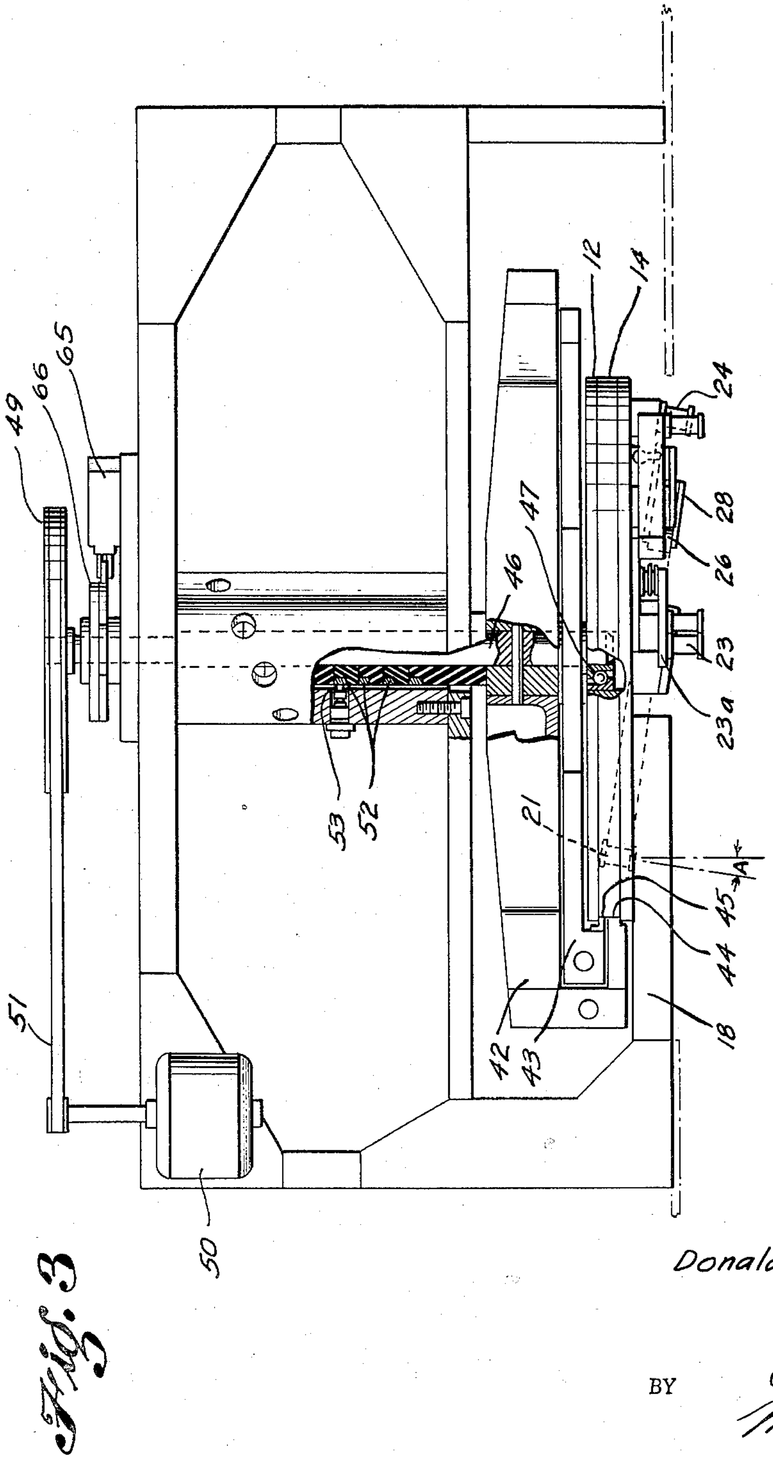
Figure 3 is an enlarged, partly cut-away side elevation view taken through line 3—3 of Figure 1.

As illustrated in Figures 2 and 3 the transducing means of the apparatus of the invention includes two transducing head support arms 42 and 43, each supporting a transducing head such as a playback head 44 and 45, respectively. The arms 42 and 43 are fixed to a common spindle 46 for rotation therewith and in an arcuate path adjacent to the disk surface 14. The arms rotate in planes containing the support disk 12 and contact the tape 11 supported on the disk surface. The heads 44 and 45 are positioned to scan transversely spaced portions of the disk surface 14 and the arms 42 and 43 are mounted to clear one another so that the arms may be moved relative to each other in directions along the arcuate disk support surface. The arms 42 and 43 are connected to each other for normal rotation in unison. However, as will be described below, means are provided for periodically changing the relative spacing of the arms 42 and 43 with respect to each other so that the heads 44 and 45 may be spaced from each other in directions along the arcuate disk surface 14. The spindle 46 is journalled at opposite ends thereof in ball-bearing supports 47 and is connected to a drive wheel 49. The wheel 49 is driven by a constant speed motor 50 by means of a drive belt 51. In order to assure uniform rotation of the spindle 46 the drive wheel 49 is preferably made relatively massive so as to serve as a flywheel.

The spindle 46 is provided with a number of electrical slip rings 52 each positioned to be engaged by a pick-up brush 53. The outputs of the heads 44 and 45 are connected to preamplifiers (not shown) housed within the first arm 42, and the outputs of the preamplifiers are connected to the slip rings 52 for connection by means of the brushes 53 to appropriate utilization devices.

As indicated above, the relative spacing of the transducing heads 44 and 45 in directions along the circuit tape path may be varied. For convenience of expression the spacing between the centers of the heads 44 and 45 in directions along the tape path will hereinafter be referred to as a circumferential displacement. The change in circumferential displacement is effected by an advancing mechanism to be described wherein one arm 43 is moved relative to the other arm 42 during a time interval between successive scansions of the tape support surface 14 by the heads 44 and 45. In the embodiment illustrated the circumferential displacement is increased logarithmically from an initial position of no circumferential displacement of the heads relative to each other to a final position, at the end of 48 scansions of the surface 14 by the heads, of 2.5 inches circumferential displacement. The heads return to the initial position of no displacement before the start of the 49th scansion. In this embodiment the 2.5 inches maximum circumferential displacement of the first head 45 with respect to the second head 44 represents an arcuate displacement of 23 degrees, 54 seconds.

Figures 5 and 6 illustrate the means for changing the circumferential displacement of the heads with respect to each other. This is accomplished by advancing one arm 43 with respect to the other arm 42 in a direction along the arcuate disk surface 14. The arms 42 and 43 are shown in a position of no circumferential displacement in Figures 1, 3, 5 and 6 and are shown in a position of maximum displacement in Figure 2. The arm 43 to be advanced is controlled in position, relative to the other arm 42, by means of a pin 55 fixed to the second arm 43 and radially spaced along the arm from the spindle 46 to which the arm is fixed. A cylindrical surface of the pin 55 forms a cam follower 56 which mates with an arm advancing cam 57 mounted for rotation about a cam shaft 58. The driving surface of the advancing cam 57 is an exponential spiral to provide the exponential increase in displacement referred to. Thus, with each increment of rotation of the cam 57 in direction E the cam follower 56, and consequently the second arm 43, is moved an increased angular distance from the first arm 42. A tension spring 54 (Figure 2), connected between the arms 42 and 43, assures continuous contact between the cam 57 and cam follower 56.

The advancing cam 57 is controlled in rotation by a cam advancing ratchet wheel 59 fixed to the cam for rotation therewith. After each scansion of the arcuate disk surface by the arms 42 and 43, the ratchet wheel 59 is actuated by a conventional rotary solenoid 60 to be rotated an angular distance corresponding to the distance between centers of adjacent ratchet teeth 61. The ratchet wheel 59 is controlled in rotation by a driving pawl 62 mounted for arcuate movement about a pivot 63 fixed to a solenoid cam 64.

The solenoid 60 is connected for actuation by a microswitch 65 (Figure 3). The microswitch 65 is positioned to be momentarily actuated by a spindle cam 66, fixed to the spindle 46, after each scansion of the arcuate disk surface 14 by the arms 42 and 43. On actuation the solenoid disk cam 64 rotates a short angular distance in direction F and first unlocks a ratchet wheel locking pawl 67, by moving a pin cam follower 68 in direction G against the pull of a locking pawl biasing spring 69, and then moves the driving pawl 62 a distance in direction H sufficient to advance the ratchet wheel 59 an angular distance corresponding to the distance between centers of adjacent ratchet teeth 61. At the end of the period of activation of the solenoid 60 the solenoid cam 64 returns to the position illustrated in Figure 6, whereupon the locking pawl 67 again engages the ratchet wheel 59 under the pull of the biasing spring 69 and locks the wheel against rotation. A second locking pawl 70 is used to preserve the ratchet wheel 59 from backward rotation during the unlocking of the first locking pawl 61. To this end the second locking pawl 70 is spring biased by a spring 71 to allow the ratchet wheel to move in one direction E only. From the foregoing it is seen that the advancing cam 57, fixed to the ratchet wheel 59, is caused to rotate equal angular increments between successive scansions of the heads 44 and 45. By this means the circumferential displacement of the heads 44 and 45 is increased between successive scansions.

The tape receiving support surface 14 of the support disk 12 is illustrated in detail in Figures 7 and 8. Figure 7 illustrates a portion of the support disk surface 14 during a time between scansions of the surface portion, and Figure 8 illustrates the same surface during scansion thereof. The disk 12 is made of a member 73 having a high resiliency, and with the surface of the member such that a low friction coefficient exists between the member and the tape supported thereon. This resilient member 73 may take the form of a fiber glass cloth element 74, coated with a material known as Teflon, supported on a polyurethane foam element 75, and fixed in the desired position at the periphery of the disk 12 by means of a pair of lips 76 and 77 extending radially outwardly from the disk. The support disk 12 is also provided with a pair of tape guide elements 78 and 79, one element adjacent to each edge of the resilient member 73, which serve to maintain magnetic tape 11 in a desired path during its travel along the disk surface 14.

The need for the resilient tape supporting surface aforementioned becomes apparent from an appreciation of the fact that the thickness of the magnetic tape varies to a small degree along its length. Therefore, it is not possible to scan the tape on a rigid surface using a rigidly mounted transducing head in contact with the tape. If the head were spring mounted with sufficient spring tension to overcome inertial forces at high scan speeds, and the tape support surface were rigid, the oxide coating of the tape would be worn off. Therefore, the tape supporting surface of the support disk is made resilient and the transducing head is adjusted so that it pushes the tape a small distance below the undisturbed position of the disk surface. The depth of penetration of the heads into the support surface has been exaggerated in Figure 8 for illustrative purposes. It has been found that with the arrangement the tape can be scanned thousands of times without appreciable wear.

The apparatus of Figure 1 is useful, for example, in computing the auto-correlation or cross-correlation between samples of data recorded on magnetic tape. The correlation function of the signals is obtained by repetitively scanning a portion of the magentic tape (the tape being preserved from motion across its support disk) and reading the tape with the two heads moving at a constant angular velocity. Starting with no circumferential spacing between the two heads during a first scansion, the spacing is increased between successive scansions of the tape portion for the next 47 scansions above described, whereupon the heads are returned to their initial position, a new portion of tape is drawn around the support disk in position for scansion, and the cycle is repeated. The output signals from the heads are correlated by appropriate, well-known, data processing machinery (not shown). The correlation usually involves multiplying the output signals together and then integrating the resultant product for each scansion of the heads. The resultant integral for each scansion of the tape portion by the heads represents one point of the correlation function. The 48 integrals thus represent 48 points of the correlation function.

The signals recorded on the tape are preferably recorded using well known frequency modulation carrier techniques. The frequency modulated output signals from each of the heads would then be demodulated to varying direct current signals before being multiplied together.

From the foregoing it is seen that the invention provides an improved method and apparatus which lends itself to the presentation of high frequency signals at low magnetic tape speeds, as well as to the presentation of different combinations of recorded signals. While some fields of use have been described, it will be appreciated that the method and apparatus may be used to advantage in other signal storage and/or playback environments.

What I claim as new and desire to secure by Letters Patent of the United States is:

1. A magnetic transducing system comprising: means positioned to support a portion of a length of elongated magnetic tape for movement in an arcuate path; transducing means mounted for continuous movement in a second path adjacent to said arcuate path and having a plurality of transducing elements fixed for predetermined movement with respect to each other in directions along said arcuate path; said transducing means being mounted for making a plurality of passes adjacent to said arcuate path during the time required for a single passage of said tape through said arcuate path; and means connected between said elements for periodically, and exponentially changing the arcuate distance between said elements; at least one of said elements being positioned closely adjacent to said arcuate path through substantially all positions of said transducing means in adjacency to said given path.

2. Magnetic transducing apparatus comprising: means positioned to support a portion of a length of magnetic tape in an arcuate path; transducing means mounted for rotation in a circular path around said arcuate path, said transducing means including a pair of transducing heads mounted for scansion of different portions of said arcuate path and fixed for predetermined movement with respect to each other in directions along said circular path; and means connected between said heads to periodically, and exponentially change the displacement of said heads with respect to each other in said directions; whereby said apparatus is adapted to provide different combinations of correlation between signals.

3. Magnetic transducing apparatus comprising: means positioned to support magnetic tape in an arcuate path; transducing means mounted for continuous rotation in a circular path around and including a portion of said arcuate path and positioned to effect contact scansion of said tape, said transducing means including a pair of transducing heads mounted for simultaneous scansion of different portions of said arcuate path and for movement with respect to each other in directions along said circular path; and means connected between said heads to periodically, exponentially change the displacement of said heads with respect to each other in said directions; whereby said apparatus is adapted to provide different combinations of correlation between signals.

References Cited in the file of this patent

UNITED STATES PATENTS

| | | |
|---|---|---|
| 2,528,699 | Masterson | Nov. 7, 1950 |
| 2,690,473 | Cooley | Sept. 28, 1954 |
| 2,693,908 | Favre | Nov. 9, 1954 |
| 2,755,422 | Livingston | July 17, 1956 |
| 2,800,654 | De Rosa | July 23, 1957 |
| 2,814,030 | Miller et al. | Nov. 19, 1957 |
| 2,820,688 | Philbrick | Jan. 21, 1958 |

OTHER REFERENCES

The Review of Scientific Instruments, vol. 23, No. 7, July 1952, pp. 347–349.

Electronic Design, January 1955, pages 32, 33.